Patented Aug. 30, 1927.

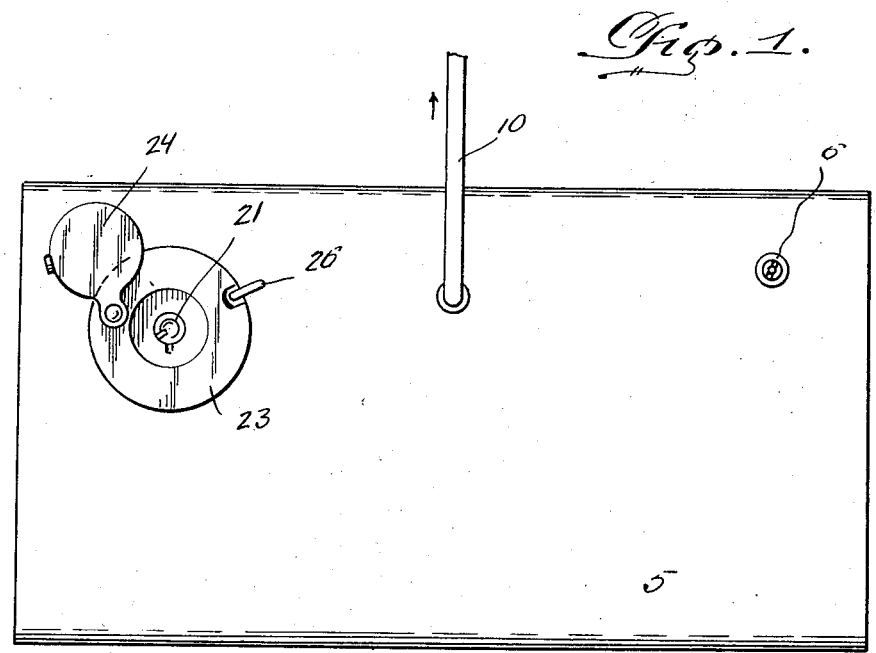
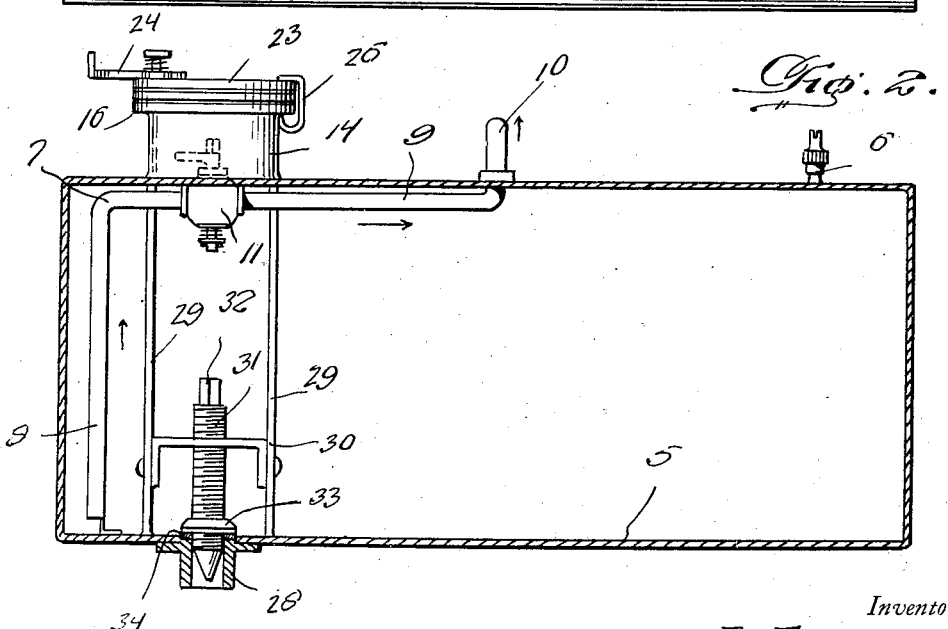

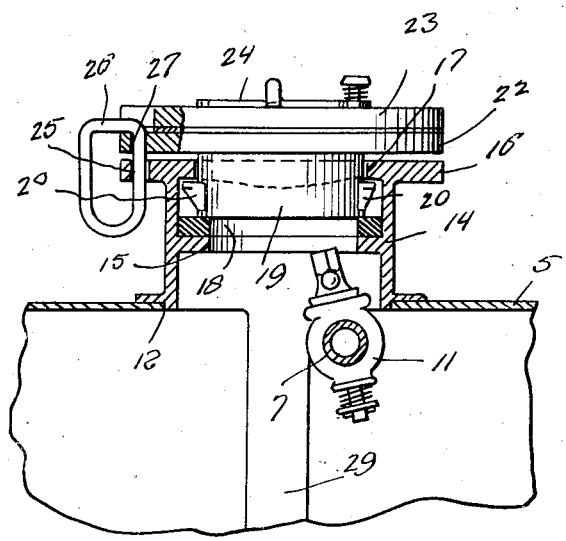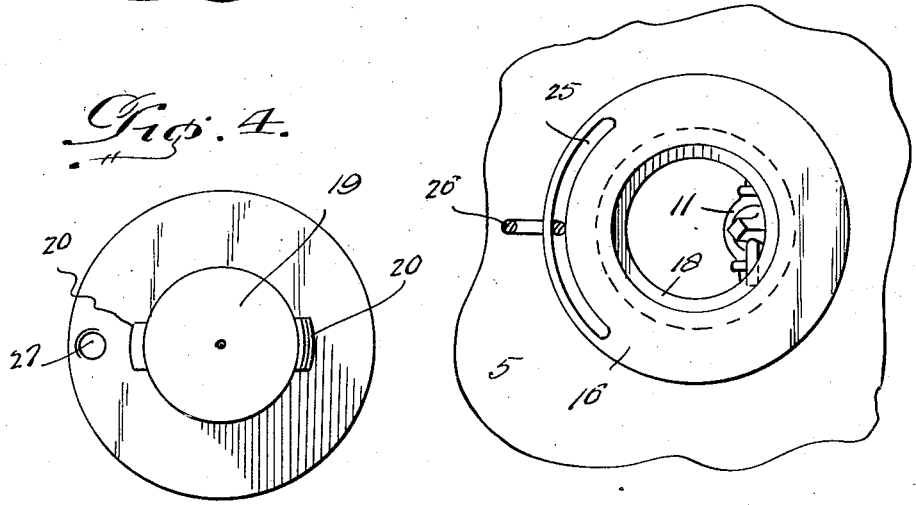

1,640,722

UNITED STATES PATENT OFFICE.

JAMES T. ROATEN AND ROY BEDFORD, OF SHERIDAN, WYOMING.

MOTOR-VEHICLE FUEL TANK.

Application filed March 29, 1927. Serial No. 179,369.

This invention relates to new and useful improvements in fuel tanks for automobiles, and aims to provide a tank having a fuel flow pipe leading therefrom, said pipe being constructed with a cut off valve arranged directly beneath the filler opening of the tank, which filler opening is provided with a lock cap to prevent access to the valve with the obvious result of permitting the cutting off of the flow of fuel so that in the event the car is stolen, it will only run for a short distance.

The invention further aims to provide a fuel tank of this character having a drain valve that may only be operated by the insertion of a tool through the filler neck when the cap is released therefrom, for preventing any liability of the fuel being stolen or removed therefrom by unauthorized persons.

A still further and important object is to provide a highly novel, simple and efficient lock cap for the filler opening of the tank so that access cannot be gained to the interior of the tank, which would otherwise permit of the operation of the fuel flow pipe valve and the drain valve unless such is desired on the part of the operator.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the several views:

Figure 1 is a top plan view of an automobile fuel tank constructed in accordance with the present invention.

Figure 2 is a detail longitudinal section therethrough.

Figure 3 is an enlarged fragmentary section through the filler neck of the tank for more clearly disclosing the construction of the lock cap and the disposition of the fuel flow pipe valve with respect to said neck.

Figure 4 is a bottom plan view of the lock cap per se.

Figure 5 is a fragmentary top plan of the tank at the filler neck, the cap being removed therefrom.

Now having particular reference to the drawings, 5 designates a fuel tank for automobiles and the like that may be, and preferably is equipped with a conventional air inlet check valve 6 so that air under pressure may be injected into the tank if it is required to force the fuel therefrom under air pressure. Arranged within this tank 5 is a fuel pipe 7 constructed to provide a vertical portion 8 and horizontal portion 9, the vertical portion thereof being in slight spaced relation with the bottom wall of the tank, while the horizontal portion 9 is directly beneath the top wall and leads through the top wall as at 10 so that the fuel may be conveyed to the carburetor or other vaporizing mechanism of the vehicle engine. Within the horizontal portion 9 of this flow pipe 7 is a control cock 11 of generally conventional design. The top wall of the tank 5 is formed with a circular opening 12 eccentrically arranged with respect to the cock 11 so that said cock will partially extend therethrough and be disposed at the edge of the opening. Arising from this opening is a cylindrical neck 14 formed internally with a circumferential flange 15, said neck being formed at its upper end with an outwardly extending circumferential flange 16 and at this end with an inwardly extending circumferential flange 17, the edge of which terminates within the edge of the first mentioned flange 15 as clearly disclosed in Figure 3. The under surface of this flange 17 is of sloped formation at diametrically opposed points, for a purpose hereinafter more fully described. Arranged upon the flange 15 is a packing ring 18, while adapted to be disposed within the neck for rest upon this packing ring is a generally conventional key controlled lock cap 19, the diametrically opposed latch members 20—20 of the barrel 21 being adapted for engagement beneath the uppermost flange 17 of the neck 14. By turning the cap, these latch members will come into engagement with the sloped surfaces of the flange 17 and cause the downward forcing of the barrel of the lock cap within the neck 14 so as to compress the packing ring 18 for effecting a seal to prevent the escape of the gasoline through the cap.

Arranged upon the usual circular plate 22 of this type of lock cap is a metallic ring 23 to which is pivoted a plate 24 for the purpose of covering the center of the ring and consequently the usual key opening of the lock as disclosed in Figure 1 to prevent the accumulation of dirt, water or the like upon the lock plate within said wing 23.

The outer flange 16 upon the upper end of the neck 14 is formed at its edge with an elongated slot 25, while arranged therein is a link 26 that is arranged through an opening 27 at the edge of the plate 22. Such a connection between the neck 14 and lock cap will facilitate the turning of the cap within the neck so that the lock cap 19 may be wedged against the packing 18. This connection also permits the cap to be removed from the neck and swung over upon the tank 5 so as to facilitate the filling of the tank.

Directly beneath the center of the opening 12 in the tank 5, the bottom wall of said tank is equipped with a fuel drain sleeve 28, while extending vertically from opposed sides of this sleeve within the tank are spaced parallel metallic legs 29—29 that are preferably formed integrally at their upper ends with the filler neck 14. Connecting these legs 29—29 is a cross strip 30 threaded through which is a needle valve 31 pointed at its lower end and adapted for engagement at said lower end within the sleeve 28, the upper end of this stem having a squared pin 32 thereon so that the same may be rotated by reason of a suitable key or wrench. This needle valve stem carries inwardly of its lower end a ring 33 upon the under side of which is a washer 34 for engagement upon the inner end of the sleeve 28, when the stem is threaded downwardly so as to close the sleeve 28 to the interior of the tank 5. However, when the valve stem is turned in a reverse direction, the washer is released from the sleeve, and as a matter of fact, the valve stem is entirely raised from said sleeve so as to permit of the uninterrupted flow of the fuel through said sleeve.

It will thus be seen that we have provided a highly novel, simple and efficient motor vehicle fuel tank that is well adapted for all the purposes heretofore designated, and even though we have herein shown and described the invention as consisting of certain detail structural elements, it is nevertheless to be understood that some changes may be made therein without affecting the spirit and scope of the appended claims.

Having thus described the invention, what we claim is:—

1. In a closure for a gasoline tank filler opening, wherein the tank is provided with a drain opening in opposed relation to the filler opening, a neck constructed for engagement within the filler opening, a locking cap associated with the neck, depending legs carried by the neck and extending downwardly to the bottom of the tank at opposite sides of the drain opening, a strip extending transversely between the legs directly over the drain opening and provided with a threaded opening, and a valve pin threaded through the threaded opening in the cross strip for engagement at its lower end in the drain opening, said valve being accessible only from the interior of the tank.

2. In a closure for gasoline tank filler openings, a neck extending upwardly from the filler opening, an internal annular flange formed on the intermediate portion of the neck, a packing ring for rest upon the flange, an internal annular flange formed on the upper end of the neck, the inner diameter of the upper flange being greater than the inner diameter of the lower flange, an external annular flange formed on the upper end of the neck, a lock cap adapted for removable disposition in the upper open end of the neck, said lock cap being of a diameter slightly greater than the inner diameter of the first mentioned annular flange, means for securing the lock cap to the external annular flange formed on the upper end of the neck, said lock cap being capable of partial rotation as well as swinging movement, and additional means for urging the lock cap downwardly against the packing ring to compress the same and form a seal.

3. In a closure for gasoline tank filler openings, a neck extending upwardly from the filler opening, an internal annular flange formed on the intermediate portion of the neck, a packing ring for rest upon the flange, an internal annular flange formed on the upper end of the neck, the inner diameter of the upper flange being greater than the inner diameter of the lower flange, an external annular flange formed on the upper end of the neck, a lock cap adapted for removable disposition in the upper open end of the neck, said lock cap being of a diameter slightly greater than the inner diameter of the first mentioned annular flange, means for securing the lock cap to the external annular flange formed on the upper end of the neck, said lock cap being capable of partial rotation as well as swinging movement, key controlled means for locking the cap to the upper internal annular flange to prevent the removal of the cap from the neck, and additional means for urging the cap downwardly against the packing ring to compress the same and form a seal.

4. In a closure for gasoline tank filler openings, a neck extending upwardly from the tank filler opening, an internal annular flange formed on the intermediate portion of the neck, a packing ring for rest upon the internal flange, an internal annular flange formed on the upper end of the neck, the inner diameter of the upper flange being greater than the inner diameter of the lower internal flange, an external annular flange formed on the upper end of the neck, a lock cap adapted for removable disposition in the upper open end of the neck, said cap being of a diameter slightly greater than the inner diameter of the lower internal annular flange, a cap plate on the top of the lock cap for rest upon the external annular flange formed on the neck, said external flange and said cap plate being provided with registering elongated arcuate slots, a link extending through the slots whereby to provide an operative connection between the cap plate and the external flange to permit rotatable and swingable movement of the lock cap with respect to the filler neck, key control locking means carried by the lock cap for cooperation with the upper internal annular flange for locking the lock cap against swinging movement, and additional means for forcing the lock cap downwardly against the washer to compress the same and form a seal, when the lock cap is rotated in one direction.

In testimony whereof we affix our signatures.

JAMES T. ROATEN.
ROY BEDFORD.